(12) United States Patent
Arakane

(10) Patent No.: US 11,135,836 B2
(45) Date of Patent: Oct. 5, 2021

(54) IMAGE RECORDING APPARATUS

(71) Applicant: Brother Kogyo Kabushiki Kaisha, Nagoya (JP)

(72) Inventor: Satoru Arakane, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/805,043

(22) Filed: Feb. 28, 2020

(65) Prior Publication Data

US 2020/0276802 A1 Sep. 3, 2020

(30) Foreign Application Priority Data

Feb. 28, 2019 (JP) .............................. JP2019-036039

(51) Int. Cl.
*B41J 2/15* (2006.01)
*B41J 2/045* (2006.01)
*B41J 2/21* (2006.01)

(52) U.S. Cl.
CPC ........... *B41J 2/0451* (2013.01); *B41J 2/0458* (2013.01); *B41J 2/04581* (2013.01); *B41J 2/2103* (2013.01)

(58) Field of Classification Search
CPC ....... B41J 2/165; B41J 2/2132; B41J 2/04586
See application file for complete search history.

(56) References Cited

U.S. PATENT DOCUMENTS

| | | | |
|---|---|---|---|
| 6,540,327 B1* | 4/2003 | Akiyama | B41J 2/2056 347/43 |
| 6,688,726 B2* | 2/2004 | Bauer | B41J 2/2132 347/41 |
| 7,503,635 B2* | 3/2009 | Seki | B41J 2/2107 347/15 |
| 7,744,188 B2* | 6/2010 | Izuo | B41J 2/165 347/19 |
| 9,561,667 B2 | 2/2017 | Yoshida | |
| 9,840,087 B2 | 12/2017 | Hoshii | |
| 2006/0125860 A1* | 6/2006 | Arazaki | B41J 2/04581 347/12 |
| 2007/0139461 A1 | 6/2007 | Izuo | |
| 2013/0194329 A1* | 8/2013 | Fujimoto | B41J 2/2132 347/9 |
| 2016/0243862 A1 | 8/2016 | Yoshida | |
| 2016/0288491 A1 | 10/2016 | Hoshii | |
| 2017/0259561 A1* | 9/2017 | Takano | B41J 2/04586 |

FOREIGN PATENT DOCUMENTS

| | | |
|---|---|---|
| JP | 2000-263772 A | 9/2000 |
| JP | 4929699 B2 | 5/2012 |
| JP | 2016-153182 A | 8/2016 |
| JP | 2016-187897 A | 11/2016 |
| JP | 2017-177423 A | 10/2017 |

* cited by examiner

*Primary Examiner* — Lam S Nguyen
(74) *Attorney, Agent, or Firm* — Banner & Witcoff, Ltd.

(57) ABSTRACT

When image recording is performed using a multi-pass recording mode, and when a dot recording ratio for a thinned-out image to be recorded by a discharge-defective nozzle is equal to or more than a threshold value, the image recording is performed on a medium after a discharge operation. When image recording is performed using the multi-pass recording mode, and when the dot recording ratio is less than the threshold value, the image recording is performed on the medium without the discharge operation.

13 Claims, 15 Drawing Sheets

CONVEYANCE DIRECTION

LEFT ←→ RIGHT
SCANNING DIRECTION

| INK COLORS | ANY OTHER COLORS THAN YELLOW | YELLOW |
|---|---|---|
| Rt | Rt1 | Rt2(>Rt1) | ered to as multi-pass recording. In this printer, in order to perform the multi-pass recording, a nozzle that is included in the nozzles used for dot formation in the overlapping area and that is positioned farther away from a center portion in the conveyance direction has a smaller dot recording ratio.

IMAGE RECORDING APPARATUS

CROSS REFERENCE TO RELATED APPLICATION

The present application claims priority from Japanese Patent Application No. 2019-036039 filed on Feb. 28, 2019, the disclosure of which is incorporated herein by reference in its entirety.

BACKGROUND

Field of the Invention

The present disclosure relates to an image recording apparatus configured to record an image by discharging ink from nozzles.

Description of the Related Art

As an exemplary image recording apparatus that records an image by discharging ink from nozzles, there is publicly known a printer that performs recording by discharging ink from nozzles.

A publicly-known printer checks a discharge state for each nozzle. The printer performs a maintenance operation when predefined conditions, based on density of discharge-defective nozzles in a nozzle row and a position of the discharge-defective nozzle before and after the maintenance operation, are satisfied.

Another publicly-known printer performs printing by repeating a pass process and a conveyance process. In the pass process, ink is discharged from a printing head on a sheet during movement in a main scanning direction of the printing head. In the conveyance process, a conveyer is used to convey the sheet in a conveyance direction. When performing the printing, two band areas of the sheet where an image is to be recorded by two continuous recording passes partially overlap with each other. The area where the two band areas overlap with each other is referred to as an overlapping area. In the two recording passes, different portions of the overlapping area are printed. The entirety of the overlapping area is printed by the two recording passes. This is referred to as multi-pass recording. In this printer, in order to perform the multi-pass recording, a nozzle that is included in the nozzles used for dot formation in the overlapping area and that is positioned farther away from a center portion in the conveyance direction has a smaller dot recording ratio.

SUMMARY

For example, the discharge state for each nozzle may be checked when an instruction for recording an image is input to the printer. When the predefined conditions are not satisfied, recording may be performed without the maintenance operation. When the predefined conditions are satisfied, recording may be performed after the maintenance operation. When the multi-pass recording described above is performed, and when the predefined conditions are satisfied, recording may be performed after the maintenance operation is performed uniformly. In this configuration, even when a nozzle of which dot recording ratio is small is the discharge-defective nozzle, recording is performed after the maintenance operation. On the other hand, when the multi-pass recording is performed, and when the nozzle of which dot recording ratio is small has abnormality, the effect on image quality of an image to be recorded is small.

As described above, recording may be performed after the maintenance operation is performed uniformly on the condition that the predefined conditions are satisfied. In this configuration, when the nozzle of which dot recording ratio is small is the discharge-defective nozzle, the maintenance operation is performed unnecessarily. This lengthens a time after the recording instruction is input until the image recording is completed.

An object of the present disclosure is to provide an image recording apparatus that is capable of providing a good image quality of an image to be recorded and making a time after a recording instruction is input until image recording is completed as short as possible.

There is provided an image recording apparatus, including: a conveyer configured to convey a medium in a conveyance direction; a recording head including a plurality of nozzles arranged in the conveyance direction; a carriage carrying the recording head and configured to move in a scanning direction intersecting with the conveyance direction; a discharge mechanism configured to discharge an ink in the recording head from the nozzles; a signal output circuit configured to output a signal that varies depending on whether the nozzles include a discharge-defective nozzle of which discharge performance is lower than a predefined discharge performance; and a controller. The controller is configured to: determine whether the discharge-defective nozzle is included in the nozzles based on the signal from the signal output circuit; control the image recording apparatus to perform image recording on the medium by causing the image recording apparatus to perform a recording pass in which the ink is discharged from the nozzles to the medium during movement in the scanning direction of the carriage and a conveyance operation in which the medium is conveyed in the conveyance direction by use of the conveyer; and control the image recording apparatus to perform the image recording by a multi-pass recording mode. The recording pass includes a plurality of recording passes performed continuously. In the multi-pass recording mode, a thinned-out image is recorded by conveying the medium in the conveyance operation such that a plurality of recording areas on the medium for which an image is to be recorded by the recording passes performed continuously partially overlap with each other, and recording a line image corresponding to one line in the scanning direction in an overlapping area, where the recording areas overlap with each other, in the recording passes performed continuously by use of the nozzles different from each other so that different parts of the line image are thinned out. In a case that the image recording is performed by the multi-pass recording mode, that the discharge-defective nozzle is included in the nozzles, and that a dot recording ratio that is a ratio of the number of dots of the thinned-out image to be recorded by the discharge-defective nozzle to the number of dots of an entirety of the line image is equal to or more than a threshold value, the controller is configured to control the discharge mechanism to perform the discharge operation and then controls the image recording apparatus to perform the image recording on the medium. In a case that the dot recording ratio for the thinned-out image to be recorded by the discharge-defective nozzle is less than the threshold value, the controller is configured to control the image recording apparatus to perform the image recording on the medium without the discharge operation by the discharge mechanism.

In a case of performing image recording by the multi-pass recording mode, the effect on image quality of an image to be recorded is small, even when a nozzle used for recording a thinned-out image of which dot recording ratio is small has abnormality. Thus, in the present disclosure, when image recording is performed using the multi-pass recording mode, and when the dot recording ratio for the thinned-out image to be recorded by the discharge-defective nozzle is equal to or more than the threshold value, the image recording is performed on the medium after the discharge operation. When the dot recording ratio is less than the threshold value, the image recording is performed on the medium without the discharge operation. This shortens a time after a recording instruction is input until the image recording is completed.

DESCRIPTION OF THE EMBODIMENTS

An embodiment of the present disclosure is explained below.

<Schematic Configuration of Printer>

Figure 1:
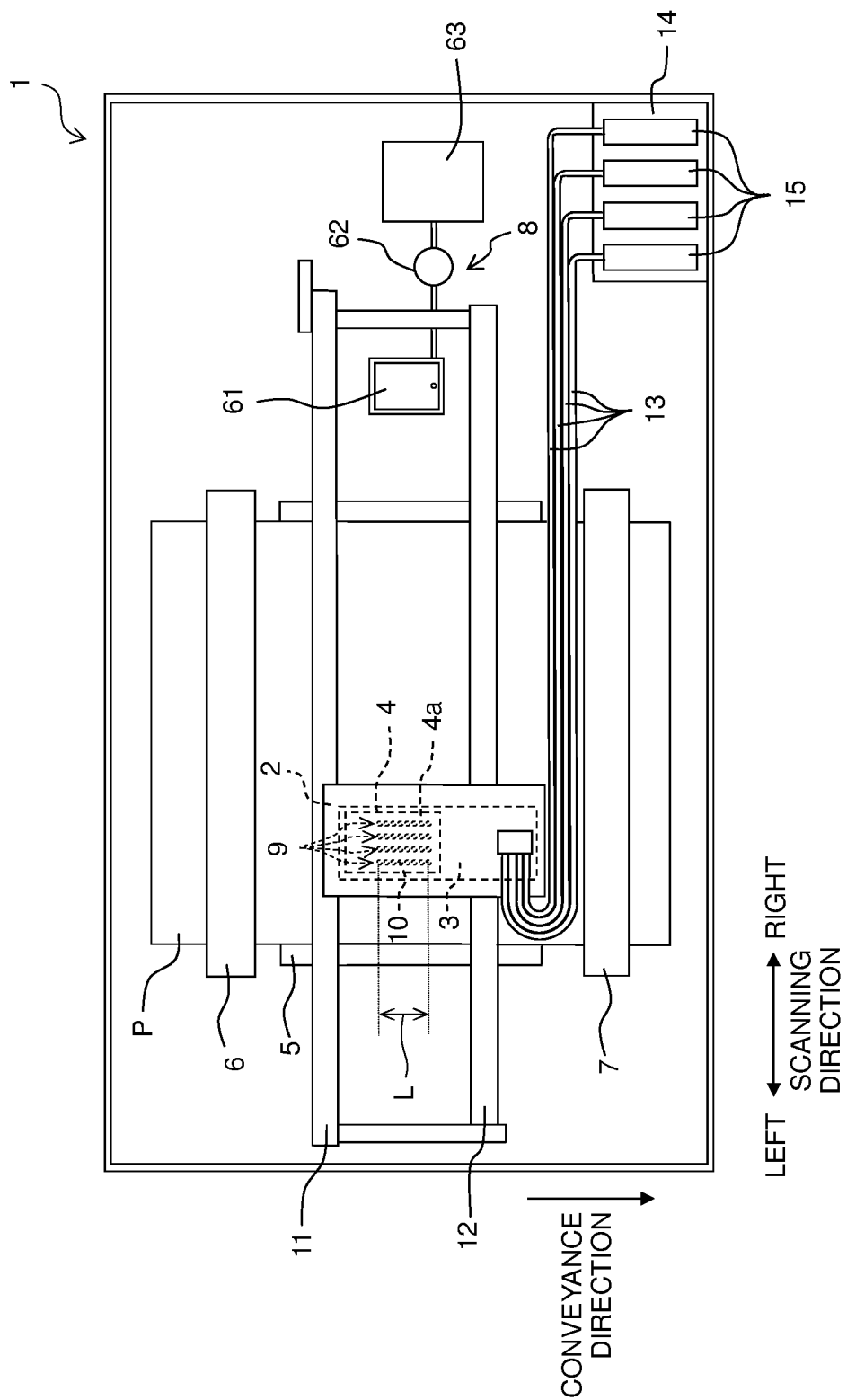
FIG. 1 schematically depicts a printer according to an embodiment of the present disclosure.

As depicted in FIG. 1, a printer 1 (an image recording apparatus of the present disclosure) according this embodiment includes a carriage 2, a subtank 3, an ink-jet head 4 (a recording head of the present disclosure), a platen 5, and conveyance rollers 6 and 7 (a conveyer of the present disclosure), a maintenance unit 8, and the like.

Figure 3:
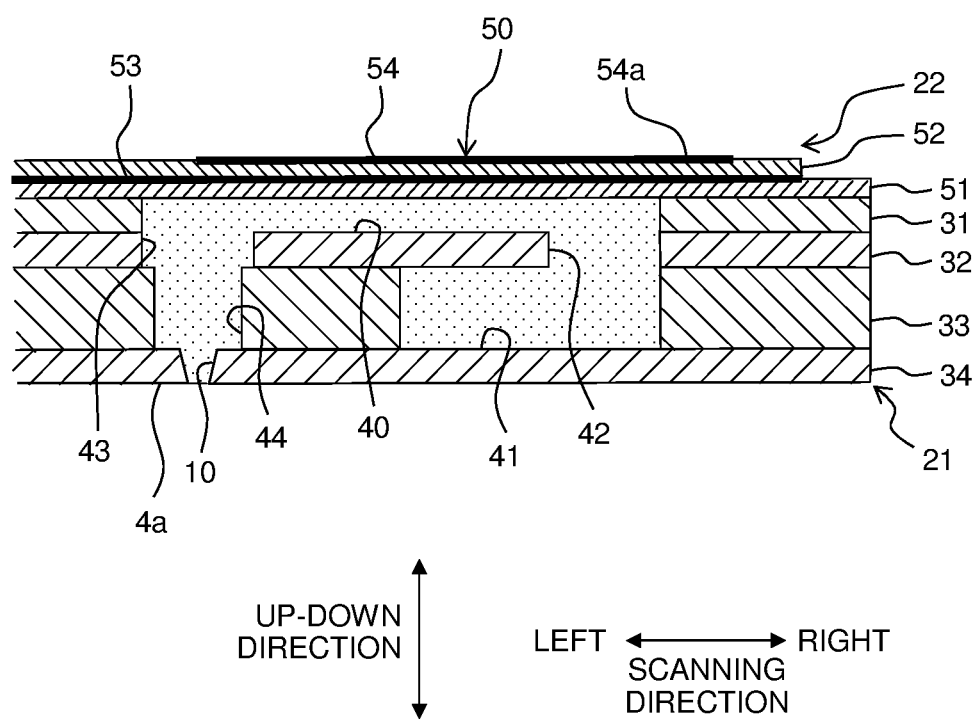
FIG. 3 is a cross-sectional view taken along a line III-III in FIG. 2.

The carriage 2 is supported by two guide rails 11 and 12 extending in a scanning direction. The carriage 2 is connected to a carriage motor 86 (see FIG. 6) via a belt (not depicted). When the carriage motor 86 is driven, the carriage 2 moves along the guide rails 11 and 12 in the scanning direction. In the following description, the right and left sides in the scanning direction are defined as indicated in FIG. 1. An up-down direction of the printer 1 is defined as indicated in FIG. 3.

The carriage 2 carries the subtank 3. The printer 1 includes a cartridge holder 14. Four ink cartridges 15 are removably installed in the cartridge holder 14. The ink cartridge 15 disposed on the rightmost side in the scanning direction contains a black ink, the second rightmost ink cartridge 15 contains a yellow ink, the third rightmost ink cartridge 15 contains a cyan ink, and the leftmost ink cartridge 15 contains a magenta ink. The subtank 3 is connected to four ink cartridges 15 installed in the cartridge holder 14 via four tubes 13. This allows the four color inks to be supplied from the four ink cartridges 15 to the subtank 3.

The ink-jet head 4 is mounted on the carriage 2 and connected to a lower end of the subtank 3. The inks of the four colors are supplied from the subtank 3 to the ink-jet head 4. Further, the ink-jet head 4 discharges the ink(s) from nozzles 10 formed in a nozzle surface 4a that is a lower surface thereof. More specifically, the ink-jet head 4 includes four nozzle rows 9 arranged in the scanning direction. In each nozzle row 9, the nozzles 10 are arranged in a conveyance direction to have a length L. The conveyance direction is orthogonal to the scanning direction. The black ink is discharged from the nozzles 10 belonging to the rightmost nozzle row 9 in the scanning direction, the yellow ink is discharged from the nozzles 10 belonging to the second rightmost nozzle row 9, the cyan ink is discharged from the nozzles 10 belonging to the third rightmost nozzle row 9, and the magenta ink is discharged from the nozzles 10 belonging to the leftmost nozzle row 9.

The platen 5 is disposed below the ink-jet head 4 and faces the nozzles 10. The platen 5 extends over an entire length of a recording sheet P (a medium of the present disclosure) in the scanning direction, and supports the recording sheet P from below. The conveyance roller 6 is disposed upstream of the ink-jet head 4 and the platen 5 in the conveyance direction. The conveyance roller 7 is disposed downstream of the ink-jet head 4 and the platen 5 in the conveyance direction. The conveyance rollers 6 and 7 are connected to a conveyance motor 87 (see FIG. 6) through gears (not depicted). When the conveyance motor 87 is driven, the conveyance rollers 6 and 7 rotate. This conveys the recording sheet P in the conveyance direction.

The maintenance unit 8 discharges the inks in the ink-jet head 4 from the nozzles 10 by performing a suction purge described below. The maintenance unit 8 is described below in detail.

<Ink-Jet Head>

Figure 2:
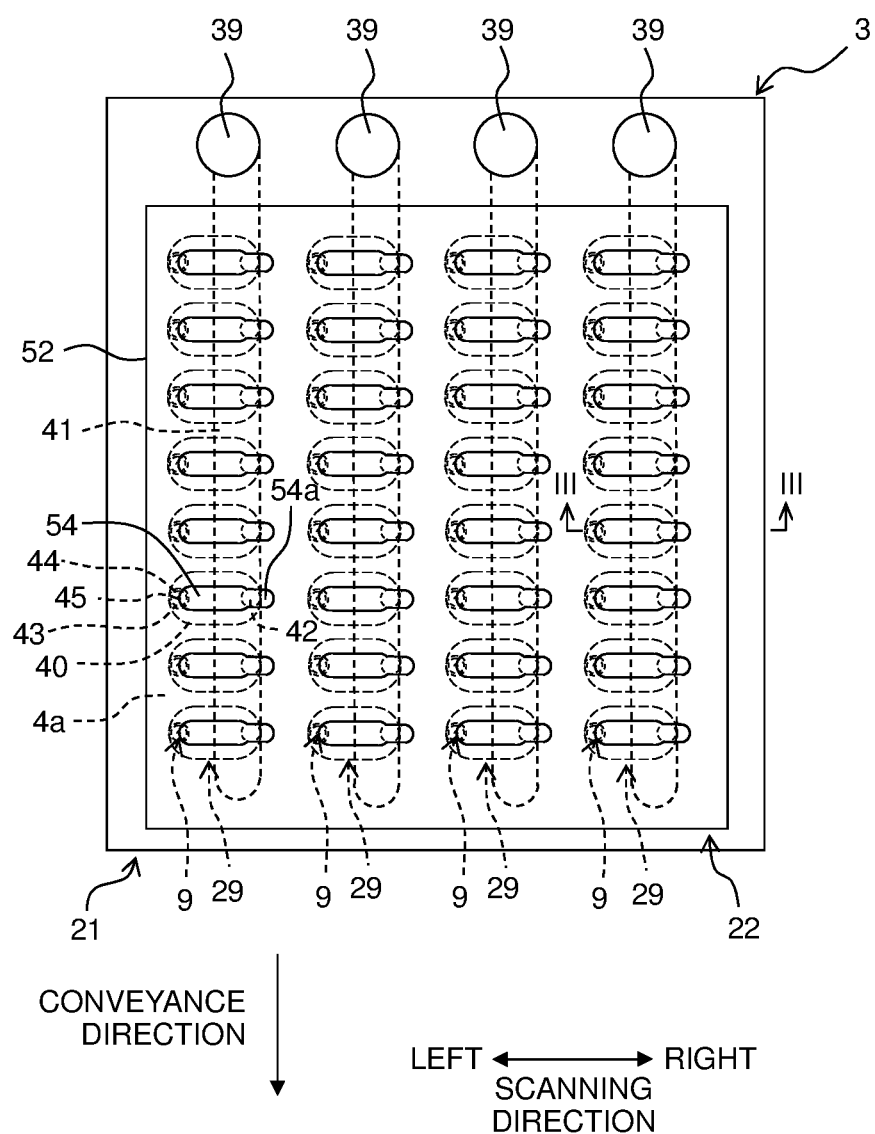
FIG. 2 is a plan view of an ink-jet head in FIG. 1.

Subsequently, the ink-jet head 4 is described below in detail. As depicted in FIGS. 2 and 3, the ink-jet head 4 includes a channel unit 21 and a piezoelectric actuator 22.

<Channel Unit>

The channel unit 21 is formed by stacking four plates 31 to 34 in that order from the top. The plates 31 to 33 are made using a metal material, such as stainless steel. The plate 34 is made using a synthetic resin material, such as polyimide.

The nozzles 10 are formed in the plate 34. The nozzles 10 form the four nozzle rows 9 as described above. A lower surface of the plate 34 is the nozzle surface 4a of the ink-jet head 4. Pressure chambers 40 are formed in the plate 31. The pressure chamber 40 has an elliptical shape in plan view of which longitudinal direction is the scanning direction. The pressure chambers 40 communicate with the respective nozzles 10. A left end in the scanning direction of each of pressure chambers 40 overlaps in an up-down direction with the corresponding one of the nozzles 10. The plate 31 is formed having four pressure chamber rows 29 arranged in the scanning direction. In each pressure chamber row 29, the pressure chambers 40 are arranged in the conveyance direction.

The plate 32 has circular through holes 42 at portions overlapping in the up-down direction with right ends in the scanning direction of the respective pressure chambers 40. The plate 32 has circular through holes 43 at portions overlapping in the up-down direction with the nozzles 10 and the left ends in the scanning direction of the respective pressure chambers 40.

Four manifold channels 41 are formed in the plate 33. The four manifold channels 41 correspond to the four pressure chamber rows 29. Each of the manifold channels 41 extends in the conveyance direction and overlaps in the up-down direction with right portions in the scanning direction of the pressure chambers 40 forming the corresponding one of the pressure chamber rows 29. This allows the respective pressure chambers 40 to communicate with the manifold channel 41 via the through holes 42. A supply port 39 is provided at an upstream end in the conveyance direction of each manifold channel 41. The ink-jet head 4 is connected to a channel in the subtank 3 via the supply port 39. Each ink is thus supplied to the manifold channel 41 from the supply port 39. The plate 33 has circular through holes 44 at portions overlapping in the up-down direction with the through holes 43 and the nozzles 10. The nozzles 10 thus communicate with the pressure chambers 40 via the through holes 43 and 44.

<Piezoelectric Actuator>

The piezoelectric actuator 22 includes a vibration plate 51, a piezoelectric layer 52, a common electrode 53, and individual electrodes 54. The vibration plate 51 is made using a piezoelectric material that includes lead zirconate titanate as a main component. The lead zirconate titanate is a mixed crystal of lead titanate and lead zirconate. The vibration plate 51 is disposed on an upper surface of the channel unit 21 to cover the pressure chambers 40. The vibration plate 51 may be made using any other insulating material than the piezoelectric material.

The piezoelectric layer 52 is made using the above-described piezoelectric material. The piezoelectric layer 52 is disposed on an upper surface of the vibration plate 51 and extends continuously over the pressure chambers 40. The common electrode 53 is disposed between the vibration plate 51 and the piezoelectric layer 52 and extends continuously over the pressure chambers 40. The common electrode 53 is connected to a power circuit (not depicted) via a trace member (not depicted). The common electrode 53 is kept at a ground potential.

The individual electrodes 54 are formed corresponding to the respective pressure chambers 40. Each individual electrode 54 has an elliptical shape in plan view that is smaller to some extent than the pressure chamber 40. The individual electrodes 54 are disposed on an upper surface of the piezoelectric layer 52 and overlap in the up-down direction with the center portions of the pressure chambers 40. The right end in the scanning direction of each individual electrode 54 extends rightward in the scanning direction to a position that does not overlap in the up-down direction with the pressure chamber 40, and the tip thereof functions as a connection terminal 54a. A trace member (not depicted) is connected to each connection terminal 54a. The individual electrodes 54 are connected to a driver IC 59 (see FIG. 6) via the trace members. The driver IC 59 selectively applies any of the ground potential and a predefined driving potential (e.g., about 20V) to the respective individual electrodes 54.

Corresponding to the arrangement of the common electrode 53 and the individual electrodes 54, portions of the piezoelectric layer 52 interposed between the common electrode 53 and the individual electrodes 54 are polarized in its thickness direction. The piezoelectric actuator 22 having the above configuration includes driving elements 50 corresponding to the pressure chambers 40. Each of the driving elements 50 applies pressure to the ink in the corresponding to one of the pressure chambers 40. Each of the driving elements 50 includes the individual electrode 54 and a portion of the vibration plate 51, the piezoelectric layer 52, and the common electrode 53 overlapping in the up-down direction with the pressure chamber 40.

A method for discharging ink from the nozzles 10 by driving the piezoelectric actuator 22 is explained. In the piezoelectric actuator 22, all the individual electrodes 54 and the common electrode 53 are kept at the ground potential in advance. When ink is discharged from a certain nozzle 10, the electrical potential of the individual electrode 54 of the driving element 50 corresponding to the certain nozzle 10 is switched from the ground potential to the driving potential. The common electrode 53 is kept at the ground potential. Then, the potential difference between the individual electrode 54 and the common electrode 53 generates an electric field in the thickness direction parallel to a polarization direction in the portion (active portion) of the piezoelectric layer 52 interposed between the individual electrode 54 and the common electrode 53. This electric field contracts the active portion of the piezoelectric layer 52 in the horizontal direction, thus deforming the portion of the vibration plate 51 and the piezoelectric layer 52 overlapping in the up-down direction with the pressure chamber 40 so that the portion becomes convex toward the pressure chamber 40 as a whole. This reduces the volume of the pressure chamber 40 to increase the pressure of the ink in the pressure chamber 40, thereby discharging the ink from the nozzle 10 communicating with the pressure chamber 40.

<Maintenance Unit>

Next, the maintenance unit 8 is explained. As depicted in FIG. 1, the maintenance unit 8 includes a cap 61, a suction pump 62, and a waste liquid tank 63. The cap 61 is disposed on the right side in the scanning direction from the platen 5. When the carriage 2 is positioned at the maintenance position on the right side in the scanning direction from the platen 5, the nozzles 10 face the cap 61.

Figure 6:
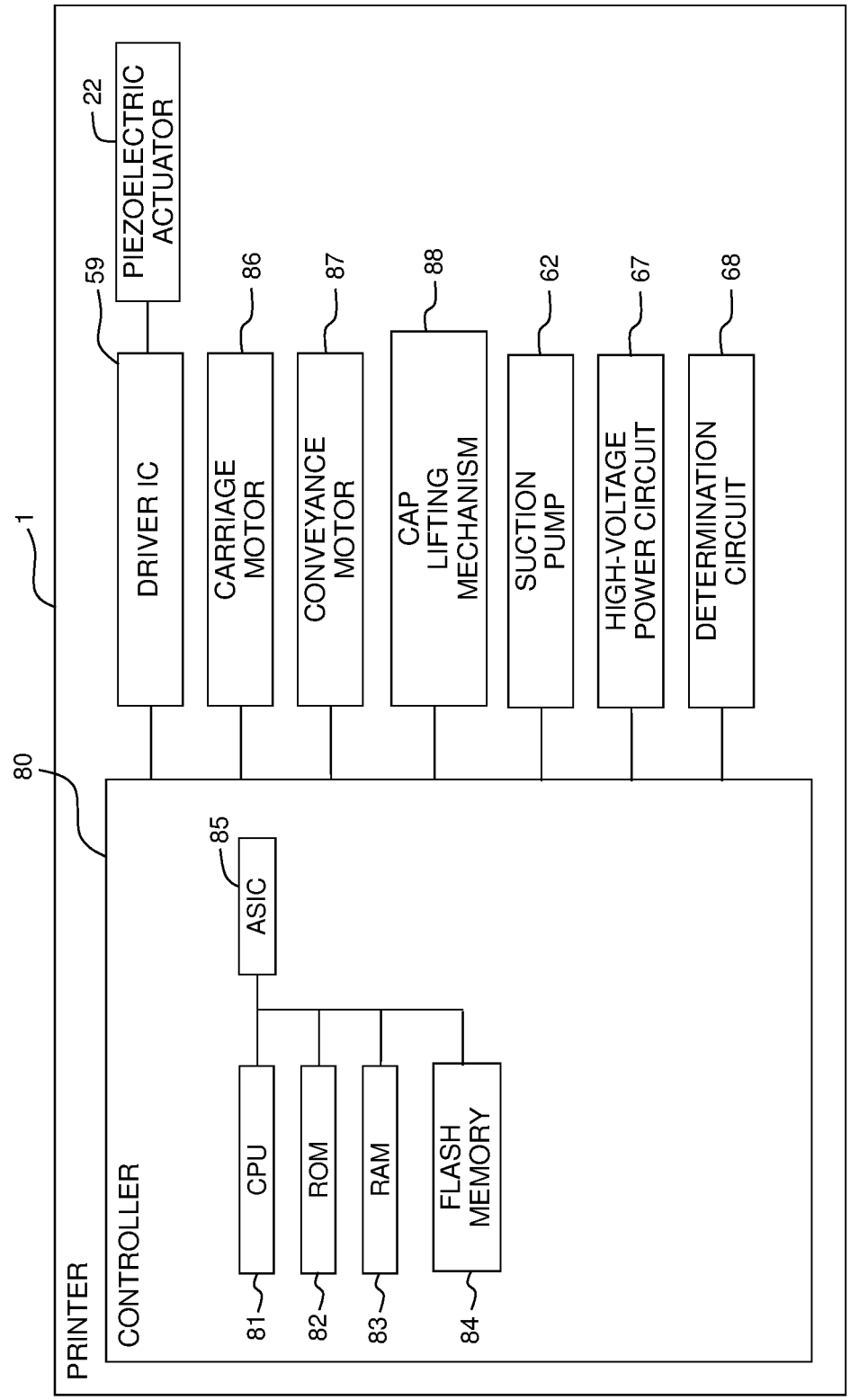
FIG. 6 is a block diagram depicting an electrical configuration of the printer.

The cap 61 can move up and down by a cap lifting mechanism 88 (see FIG. 6). The cap 61 can move upward by the cap lifting mechanism 88 in a state where the carriage 2 is positioned at the maintenance position such that nozzles 10 faces the cap 61. In this case, an upper end of the cap 61 is brought into close contact with the nozzle surface 4a, and the nozzles 10 are covered with the cap 61. The cap 61 is not limited to covering the nozzles 10 by being brought in close contact with the nozzle surface 4a. For example, the cap 61 may cover the nozzles 10 by being brought in close contact with a frame (not depicted) or the like disposed around the nozzle surface 4a of the ink-jet head 4.

The suction pump 62 is a tube pump or the like. The suction pump 62 is connected to the cap 61 and the waste liquid tank 63. In the maintenance unit 8, the suction pump 62 can be driven in a state where the nozzles 10 are covered with the cap 61 as described above. This makes it possible to perform the suction purge (a discharge operation of the present disclosure) in which the inks in the ink-jet head 4 are discharged from the nozzles 10. The inks discharged from the ink-jet head 4 are held in the waste liquid tank 63. In this embodiment, the maintenance unit 8 including the cap 61 and the suction pump 62 corresponds to a discharge unit of the present disclosure.

The above explanation has been made on the assumption that the cap 61 covers all the nozzles 10 collectively and the inks in the ink-jet head 4 are discharged from all the nozzles 10 in the suction purge, for the sake of convenience. The present disclosure, however, is not limited to such an aspect. For example, a portion covering the nozzles 10 belonging to the rightmost nozzle 9 from which the black ink is discharged and a portion covering the nozzles 10 belonging to the remaining three nozzle rows 9 that are disposed on the left of the rightmost nozzle row and from which color inks (yellow, cyan, and magenta inks) are discharged may be separately provided in the cap 61. Any of the black ink and the color inks in the ink-jet head 4 may be selectively discharged in the suction purge.

Figure 4:
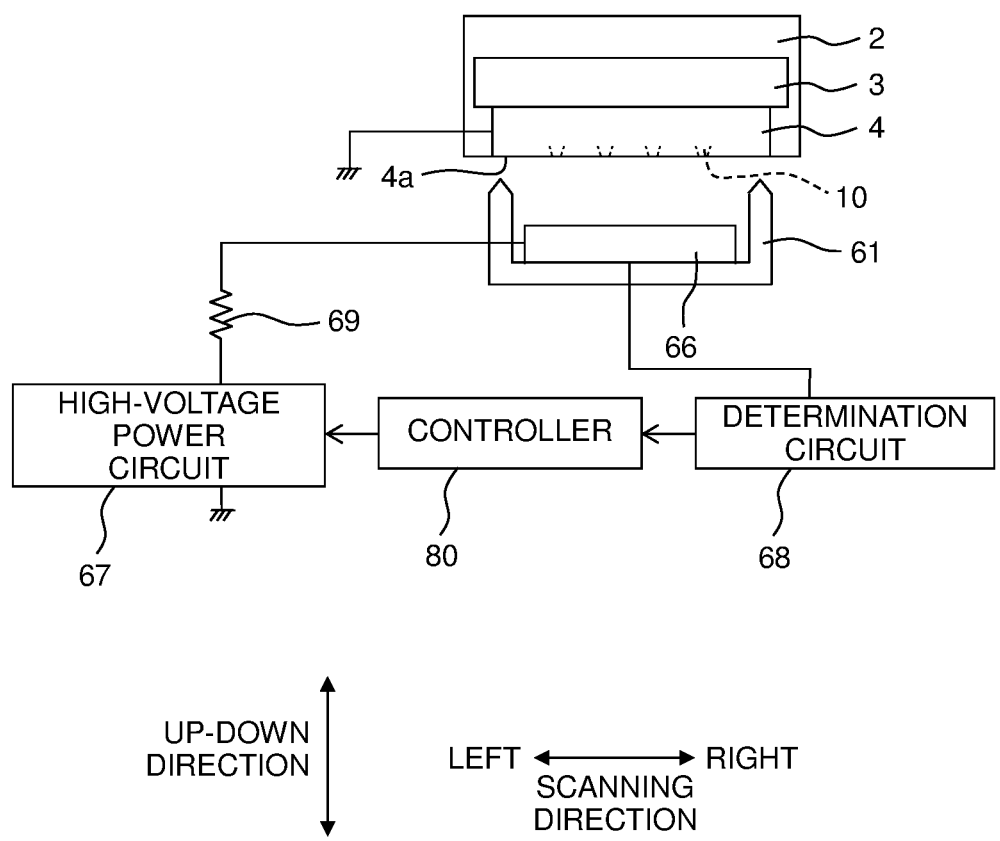
FIG. 4 illustrates a detection electrode disposed in a cap and illustrates a connection relationship between the detection electrode and a high-voltage power circuit and a connection relationship between the detection electrode and a determination circuit.

As depicted in FIGS. 1 and 4, a detection electrode 66 having a rectangular shape in plan view is disposed in the cap 61. The detection electrode 66 is connected to a high-voltage power circuit 67 via a resistance 69. The high-voltage power circuit 67 applies a predefined positive potential (e.g., about 300 V) to the detection electrode 66. The channel unit 21 of the ink-jet head 4 is kept at the ground potential. This generates a predefined potential difference between the ink-jet head 4 and the detection electrode 66. A determination circuit 68 (a signal output circuit of the present disclosure) is connected to the detection electrode 66. The determination circuit 68 compares a voltage value of a voltage signal output from the detection electrode 66 with a threshold value Vt, and outputs a signal depending on the result.

Figure 5A:
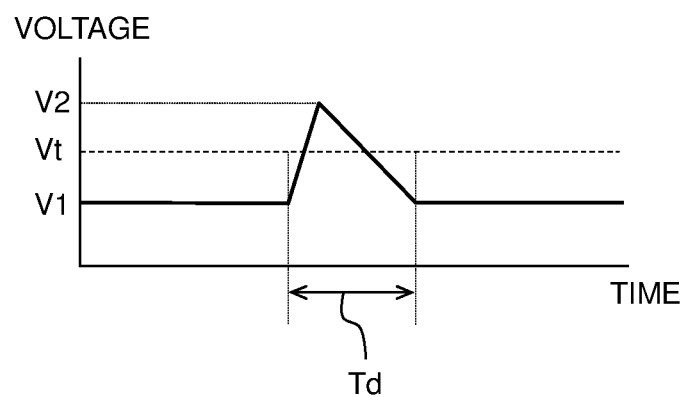
FIG. 5A depicts a change in voltage value of the detection electrode when ink is discharged from a nozzle.

More specifically, since the potential difference is generated between the ink-jet head 4 and the detection electrode 66, the ink discharged from the nozzle 10 is charged. Ink is discharged from the nozzle 10 toward the detection electrode 66 in a state where the carriage 2 is positioned at the maintenance position. As depicted in FIG. 5A, the voltage value of the detection electrode 66 increases until the charged ink approaches the detection electrode 66 and lands on the detection electrode 66. The voltage value of the detection electrode 66 reaches a voltage value V2 higher than a voltage value V1 obtained when the ink-jet head 4 is not driven. After the charged ink has landed on the detection electrode 66, the voltage value of the detection electrode 66 gradually decreases to the voltage value V1. That is, the voltage value of the detection electrode 66 changes during a driving period Td of the ink-jet head 4.

Figure 5B:
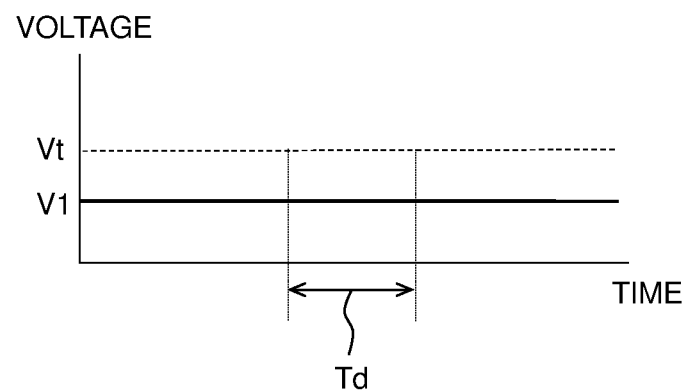
FIG. 5B depicts a change in voltage value of the detection electrode when no ink is discharged from the nozzle.

When ink is not discharged from the nozzle 10, as depicted in FIG. 5B, the voltage value of the voltage signal output from the detection electrode 66 during the driving period Td of the ink-jet head 4 hardly changes from the voltage value V1. Thus, the threshold value Vt (V1<Vt<V2) is set in the determination circuit 68 to distinguish these voltage values. The determination circuit 68 compares a maximum voltage value of the voltage signal output from the detection electrode 66 with the threshold value Vt during the driving period Td of the ink-jet head 4, and outputs a signal corresponding to the determination result.

In this embodiment, the high-voltage power circuit 67 applies the positive potential to the detection electrode 66. The high-voltage power circuit 67, however, may apply a negative potential (e.g., about −300V) to the detection electrode 66. In this case, contrary to the above, when ink is discharged from the nozzle 10 to the detection electrode 66 in the state where the carriage 2 is positioned at the maintenance position, the voltage value of the detection electrode 66 decreases until the charged ink approaches the detection electrode 66 and lands on the detection electrode 66.

<Electrical Configuration of Printer>

Next, an electrical configuration of the printer 1 is explained. The operation of the printer 1 is controlled by a controller 80. As depicted in FIG. 6, the controller 80 includes a Central Processing Unit (CPU) 81, a Read Only Memory (ROM) 82, a Random Access Memory (RAM) 83, a flash memory 84, an Application Specific Integrated Circuit (ASIC) 85, and the like. The controller 80 controls operations of the carriage motor 86, the conveyance motor 87, the driver IC 59, the cap lifting mechanism 88, the high-voltage power circuit 67, the suction pump 62, and the like. Further, the above-described signal is input from the determination circuit 68 to the controller 80.

In the controller 80, only the CPU 81 may perform a variety of processes, only the ASIC 85 may perform a variety of processes, or the CPU 81 may cooperate with the ASIC 85 to perform a variety of processes. In the controller 80, one CPU 81 may perform a process alone, or a plurality of CPU 81 may perform a process in a shared fashion. In the controller 80, one ASIC 85 may perform a process alone, or a plurality of ASIC 85 may perform a process in a shared fashion.

<Image Recording>

Subsequently, image recording on the recording sheet P by the printer 1 is explained. The printer 1 alternatingly performs a recording pass and a conveyance operation. In the recording pass, ink is discharged from the nozzles 10 of the ink-jet head 4 to the recording sheet P during the movement in the scanning direction of the carriage 2. In the conveyance operation, the recording sheet P is conveyed in the conveyance direction by use of the conveyance rollers 6 and 7. Accordingly, an image is recorded on the recording sheet P. The printer 1 can record the image on the recording sheet P by selectively using a single pass recording mode or a multi-pass recording mode.

Figure 7A:
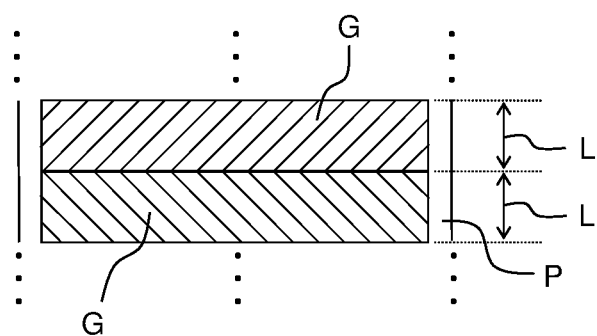
FIG. 7A depicts a positional relationship of two recording areas of a recording sheet when an image is recorded by two continuous recording passes by use of a single pass recording mode.

In the single pass recording mode, the recording paper P is conveyed in the conveyance operation by the length L of the nozzle row 9. Thus, when image recording is performed by using the single pass recording mode, as depicted in FIG. 7A, band-like recording areas G are formed adjacent to each other in the conveyance direction on the recording sheet P without overlapping with each other. The recording areas G are recorded by two continuous recording passes. The recording areas G extend in the scanning direction and the length in the conveyance direction is the length L.

Figure 7B:
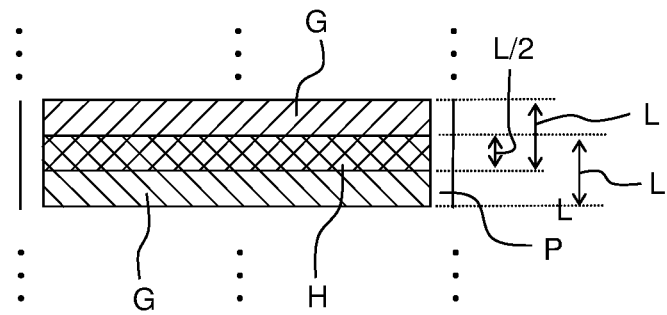
FIG. 7B depicts a positional relationship of two recording areas of the recording sheet when an image is recorded by two continuous recording passes by use of a multi-pass recording mode.

In the multi-pass recording mode, the recording paper P is conveyed in the conveyance operation by a length (L/2) that is half of the length L of the nozzle row 9. Thus, when image recording is performed using the multi-pass recording mode, as depicted in FIG. 7B, two recording areas G recorded by two continuous recording passes on the recording sheet P partially overlap with each other in an overlapping area H having the length (L/2) in the conveyance direction. In the overlapping area H, a line image is formed by arranging dots in the scanning direction through the two recording passes. In the overlapping area H, a thinned-out image, which is obtained by thinning out part of the line image, is recorded through one recording pass.

Figure 8:
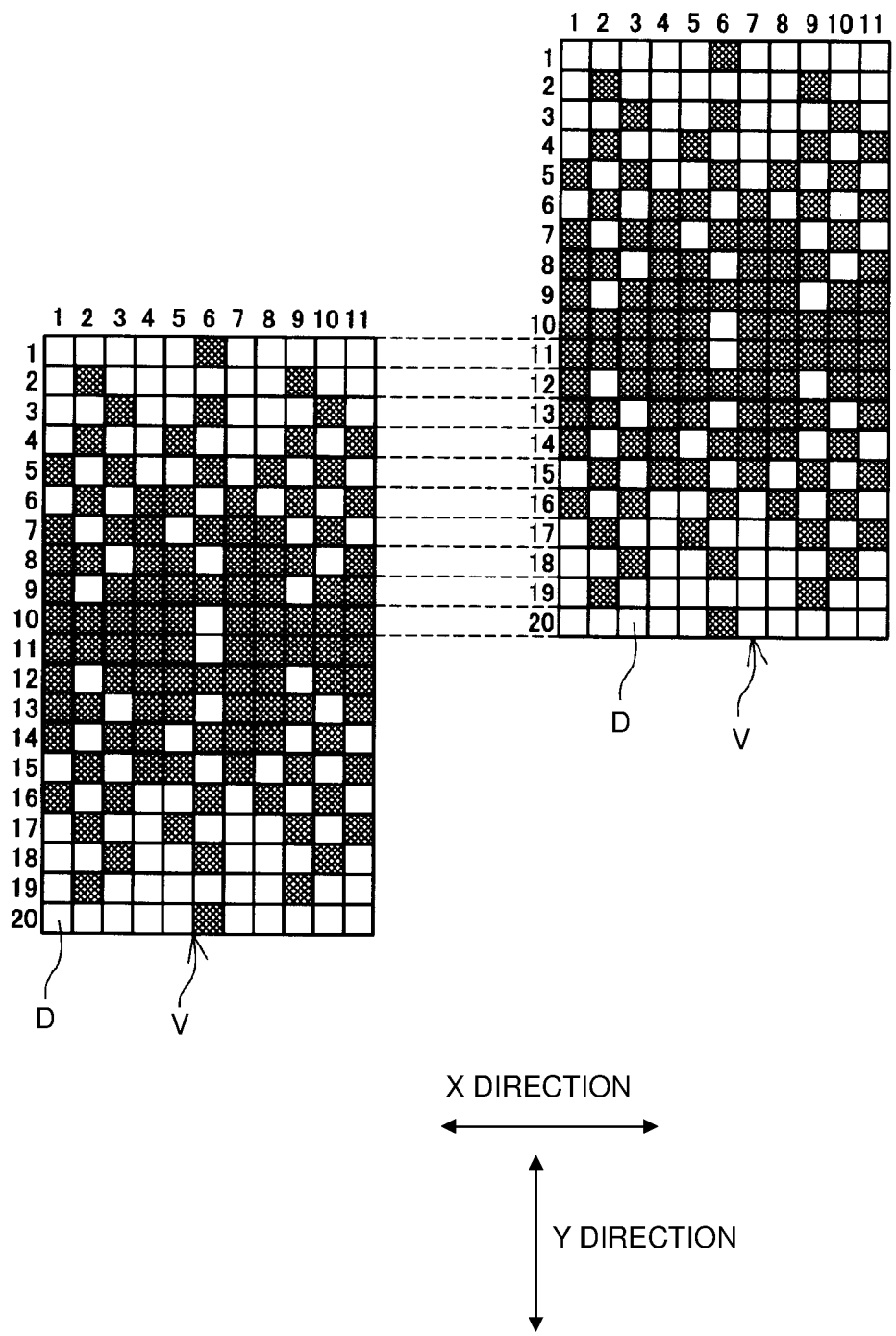
FIG. 8 illustrates mask data.

The thinned-out image is obtained by thinning out part of the line image based on, for example, mask data as depicted in FIG. 8. Each mask data V depicted in FIG. 8 is formed by a plurality of dot data D arranged lattice-likely in an X direction and a Y direction orthogonal to each other. The X direction corresponds to the scanning direction, and the Y direction corresponds to the conveyance direction. In FIG. 8, numbers 1, 2, 3, . . . , 11 arranged in the X direction each correspond to what-numbered dot from the left side in the scanning direction of the line image in an area for which recording is to be performed. Specifically, the M-th (M=1, 2, . . . , 8) dot data D from the left side in the X direction corresponds to the [M+(8×I)]-th dot (I=0, 1, 2, . . . ) from the left side in the scanning direction of the line image in the area for which recording is to be performed. FIG. 8 depicts that numbers 1, 2, 3, . . . , 19, and 20 arranged in the Y direction each correspond to what-numbered nozzle 10 from the upstream side in the conveyance direction. Although a number Nm of the nozzles 10 forming the nozzle row 9 is, for example, approximately 400, in order to simplify the drawing, the number Nm of the nozzles 10 forming the nozzle row 9 is 20 in FIG. 8. In FIG. 8, hatched dot data D indicates that ink discharge (dot formation) from the nozzle 10 is allowed, dot data D that is not hatched indicates that ink discharge from the nozzle 10 is prohibited (the dot is thinned out).

FIG. 8 indicates a relationship between the plurality of mask data V in two continuous recording passes when an image is recorded using the multi-pass recording mode. Specifically, the mask data V arranged at the left in FIG. 8 corresponds to an earlier recording pass of the two continuous recording passes, and the mask data V arranged at the right in FIG. 8 corresponds to a later recording pass of the two continuous recording passes.

As indicated in FIG. 8, in the two continuous recording passes, the K-th row dot data D (K=1, 2, 3, . . . , (Nm/2)) and the (K+(Nm/2))-th row dot data D from the upstream side in the conveyance direction correspond to the same line image. As described above, FIG. 8 satisfies Nm=20, and thus satisfies (Nm/2)=10. Further, in the plurality of mask data V, positions in the X direction of the dot data D allowing ink discharge and positions in the X direction of the dot data D prohibiting ink discharge are opposite each other in the K-th row dot data D and the (K+(Nm/2))-th row dot data D from the upstream side in the conveyance direction. Thus, portions of the line image not overlapping with each other are recorded in the two respective continuous recording passes, and the line image is completed through the two continuous recording passes.

Figure 9:
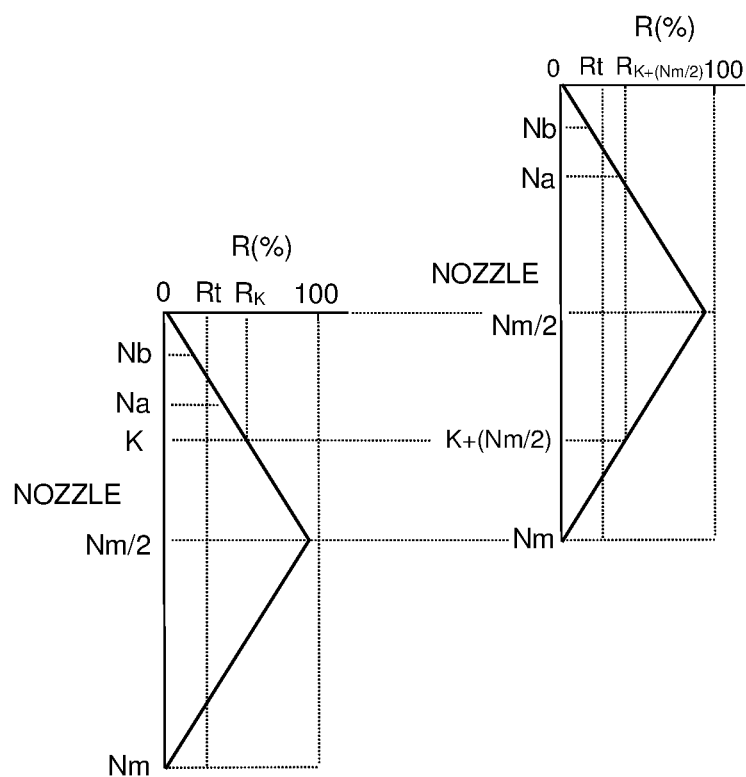
FIG. 9 illustrates a dot recording ratio for each nozzle in the mask data.

FIG. 9 is an example indicating dot recording ratios R for the thinned-out image to be recorded by the respective nozzles 10 in the mask data V. The dot recording ratio R is a ratio of the number of dots of the thinned-out image to the number of dots of the entire line image. In the following, "the dot recording ratio R for the thinned-out image to be recorded by the ink discharged from the nozzle" may be simply referred to as "the dot recording ratio R for the discharge-defective nozzle" or the like.

In FIG. 9, a vertical axis corresponds to what-numbered nozzle from the upstream side in the conveyance direction, and a horizontal axis indicates the dot recording ratio R. In the mask data V, a nozzle 10 included in the nozzles 10 of the ink-jet head 4 closer to a center portion in the conveyance direction has a larger dot recording ratio R.

FIG. 9 depicts relationships between the dot recording ratios R and the nozzles 10 in the mask data V in two continuous recording passes when an image is recorded using the multi-pass recording mode. The relationships in FIG. 9 correspond to positional relationships in the conveyance direction between the ink-jet head 4 and the recording sheet P in the two continuous recording passes. Specifically, the diagram disposed on the left in FIG. 9 and indicating the dot recording ratio for each nozzle corresponds to the earlier recording pass of the two continuous recording passes, and the diagram disposed on the right in FIG. 9 and indicating the dot recording ratio for each nozzle corresponds to the later recording pass of the two continuous recording passes.

As described above, in the two continuous recording passes, the K-th row dot data D (K=1, 2, 3, . . . , (Nm/2)) and the (K+(Nm/2))-th row dot data D from the upstream side in the conveyance direction correspond to the same line image. In the mask data V, the sum of a dot recording ratio $R_K$ for the K-th nozzle 10 and a dot recording ratio $R_{K+(Nm/2)}$ for the (K+(Nm/2))-th nozzle 10 from the upstream side in the conveyance direction is 100%.

The arrangements of the dot data D permitting ink discharge and the dot data D prohibiting ink discharge in the mask data V depicted in FIG. 8 and the dot recording ratios R for the respective nozzles depicted in FIG. 9 are examples. The arrangements of the dot data D permitting ink discharge and the dot data D prohibiting ink discharge in the mask data and the dot recording ratios R for the respective nozzles may be different from the examples in FIGS. 8 and 9.

<Control in Recording>

Next, control when the printer 1 records an image on the recording paper P is explained. When the printer 1 records an image on the recording paper P, the controller 80 performs processes in accordance with a flowchart in FIGS. 10A and 10B. The flowchart in FIG. 10A starts when a recording instruction for instructing the printer 1 to record an image on the recording paper P is input to the printer 1.

Figure 10A:
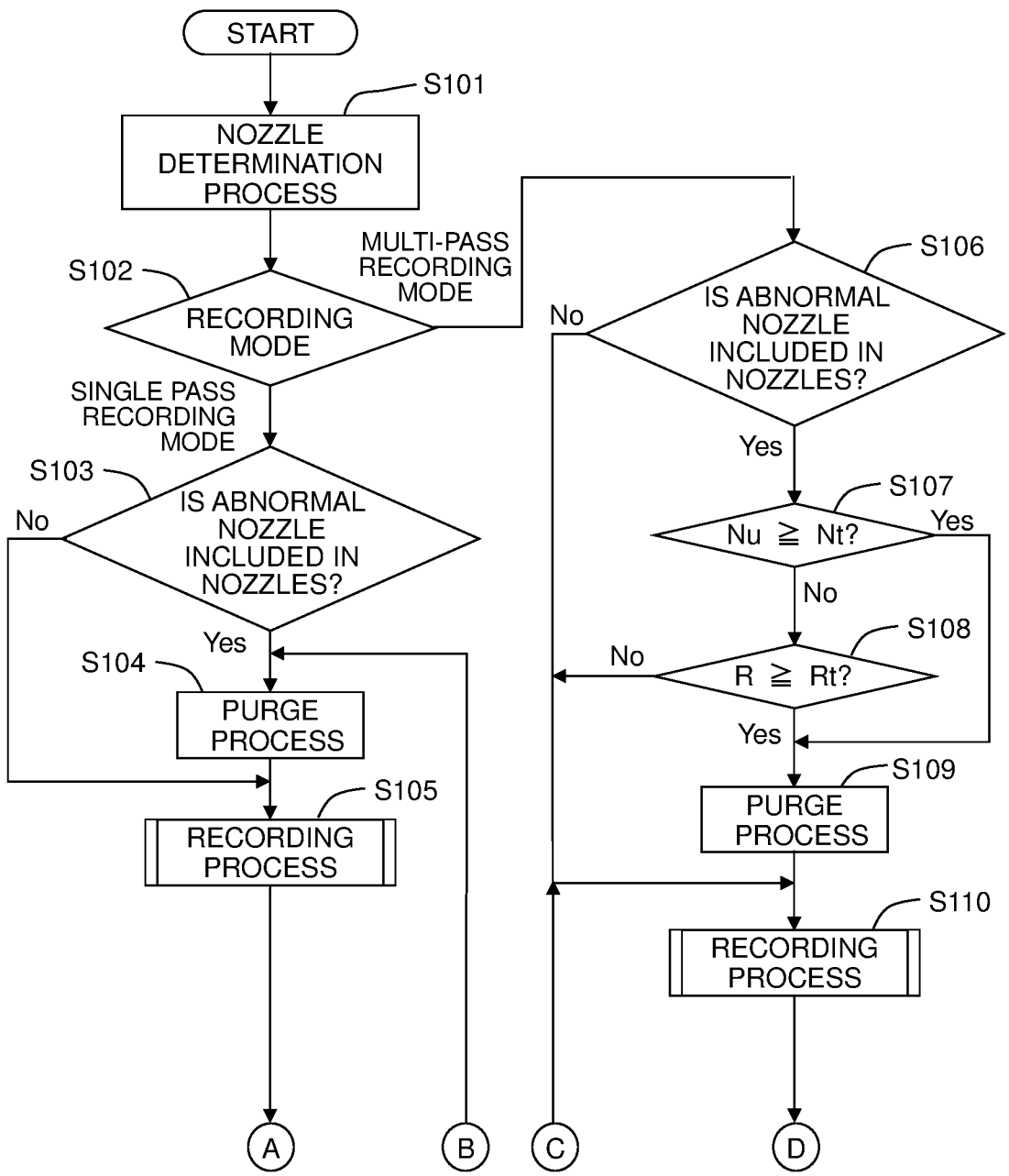
FIGS. 10A and 10B depict a flowchart indicating processes in recording.
Figure 10B:
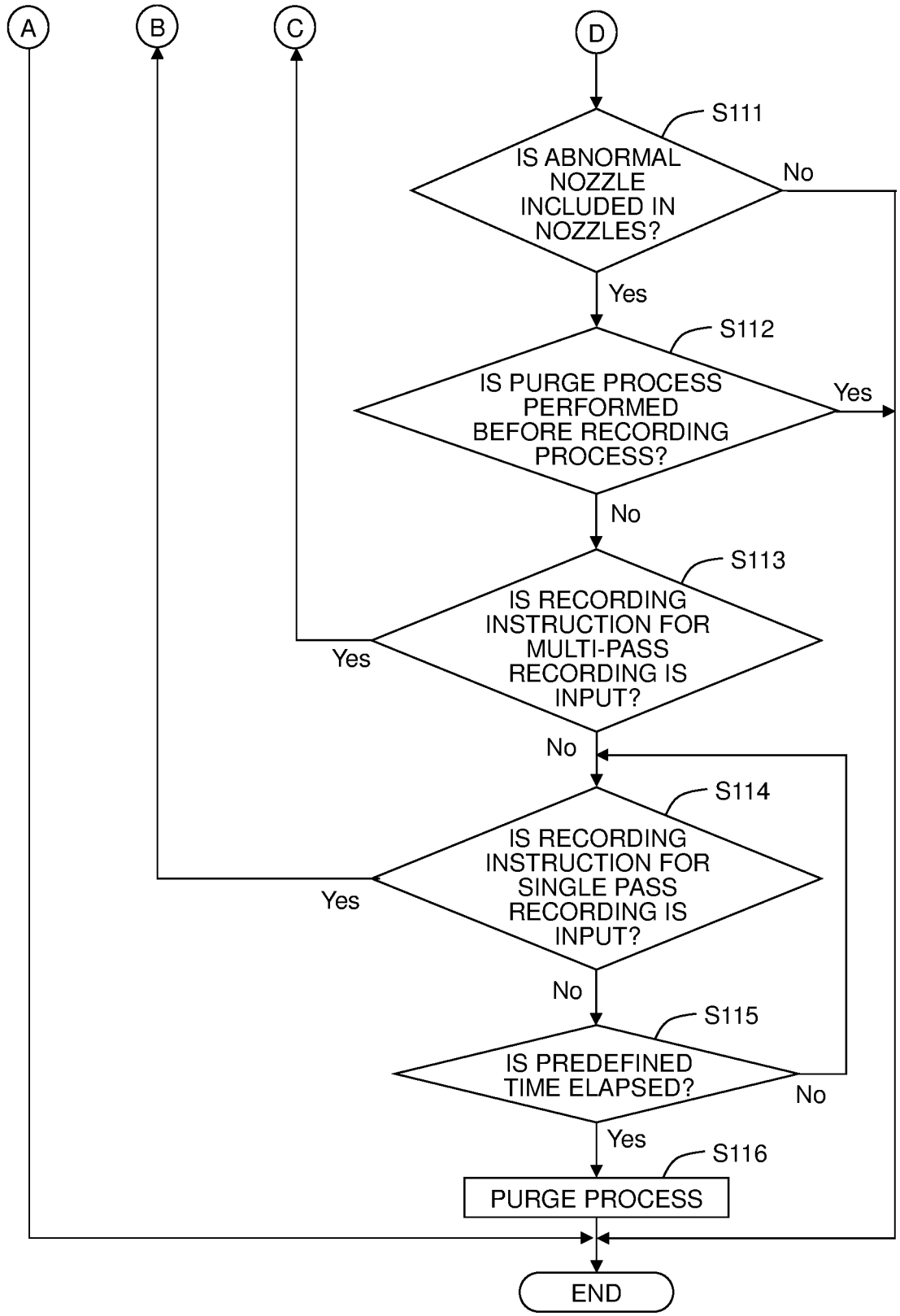

When the recording instruction is input to the printer 1, as indicated in FIG. 10A, the controller 80 first performs a nozzle determination process (S101). In the nozzle determination process, the controller 80 controls the carriage motor 86 to move the carriage 2 to the maintenance position. Then, the controller 80 controls the ink-jet head 4 to discharge ink from one of the nozzles 10 toward the detection electrode 66. This causes the determination circuit 68 to output a signal, which varies depending on whether or not ink is discharged from the one nozzle 10. The controller 80 thus determines whether the nozzle 10 is the discharge-defective nozzle based on the signal from the determination circuit 68. Ink may not be discharged properly from the nozzle 10 due to, for example, the increase in viscosity caused by the drying of ink in the nozzle 10. In other words, the discharge performance of the nozzle 10 may be lower than the predetermined discharge performance. Examples of the predetermined discharge performance include whether or not an ink droplet of a predetermined size can be jetted, whether or not the ink droplet can be jetted at a predetermined speed, and whether or not the ink droplet can be jetted in a predetermined direction. The nozzle 10 from which ink can not be discharged properly is referred to as "a discharge-defective nozzle". In this embodiment, when the signal from the determination circuit 68 indicates no ink is discharged from the nozzle 10, the controller 80 determines that the nozzle 10 is the discharge-defective nozzle. In S101, the controller 80 determines whether each of the nozzles 10 of the ink-jet head 4 is the discharge-defective nozzle as described above. The determination whether or not all the nozzles 10 are the discharge-defective nozzles is not indispensable. The determination whether or not at least one nozzle 10 is the discharge-defective nozzle may be performed.

Subsequently, the controller 80 determines the recording mode based on the recording instruction input (S102). Specifically, the controller 80 determines whether an image is recorded using the single pass recording mode or the multi-pass recording mode. For example, any of the recording modes may be set in the printer 1 in advance. When the printer 1 is set in advance to use the single pass recording mode, the controller 80 may directly proceed to S103 described below after the process in S101. When the printer 1 is set in advance to use the multi-pass recording mode, the controller 80 may directly proceed to S106 described below after the process in S101.

When image recording is performed using the single pass recording mode (S102: single pass recording mode), the controller 80 determines based on the determination result in S101 whether the nozzles 10 of the ink-jet head 4 include the discharge-defective nozzle (S103). When the nozzles 10 include the discharge-defective nozzle (S103: YES), the controller 80 performs a purge process for performing the above suction purge (S104), and then proceeds to a recording process in S105. When the nozzles 10 do not include the discharge-defective nozzle (S103: NO), the controller 80 directly proceeds to the recording process in S105 without performing the purge process in S104. After completing the recording process in S105, the controller 80 ends the series of processes in FIGS. 10A and 10B. The recording process in S105 is explained below.

When recording is performed using the multi-pass recording mode (S102: multi-pass recording mode), the controller 80 determines whether the nozzles 10 of the ink-jet head 4 include the discharge-defective nozzle, similar to S103 (S106). When the nozzles 10 include no discharge-defective nozzle (S106: NO), the controller 80 proceeds to a recording process in S110 without performing a purge process in S109 described below.

When the nozzles 10 include the discharge-defective nozzle (S106: YES), the controller 80 determines whether the number of discharge-defective nozzles Nu is equal to or more than a predefined number of nozzles Nt, based on the determination result in S101 (S107). When the number of discharge-defective nozzles Nu is equal to or more than the predefined number of nozzles Nt (S107: YES), the controller 80 performs the purge process similar to S104 (S109), and then proceeds to the recording process in S110.

When the number of discharge-defective nozzles Nu is less than the predefined number of nozzles Nt (S107: NO), the controller 80 determines whether the dot recording ratio R for the discharge-defective nozzle when part of the line image is thinned out based on the mask data V is equal to or more than a threshold value Rt (S108).

When the dot recording ratio R for at least one discharge-defective nozzle is equal to or more than the threshold value Rt (S108: YES), the controller 80 performs the purge process (S109) and then proceeds to the recording process in S110. For example, when the Na-th nozzle 10 from the upstream side in the conveyance direction (see FIG. 9) is the discharge-defective nozzle, the dot recording ratio R for the discharge-defective nozzle is equal to or more than the threshold value Rt.

When the dot recording ratios R for all the discharge-defective nozzles are less than the threshold value Rt (S108: NO), the controller 80 proceeds to the recording process in S110 without performing the purge process. For example, when the Nb-th nozzle from the upstream side in the conveyance direction (see FIG. 9) is the discharge-defective nozzle, the dot recording ratio R for the discharge-defective nozzle is less than the threshold value Rt. Further, when the nozzles 10 include no discharge-defective nozzle (S106: NO), the controller 80 does not perform the purge process in S109 and proceeds to the recording process in S110.

The recording processes in S105 and S110 are explained. The recording process in S105 is substantially the same as the recording process in S110, except that they have different conveyance amounts of the recording sheet P in the conveyance operation. The recording processes in S105 and S110 are thus explained collectively.

Figures 11, 12:
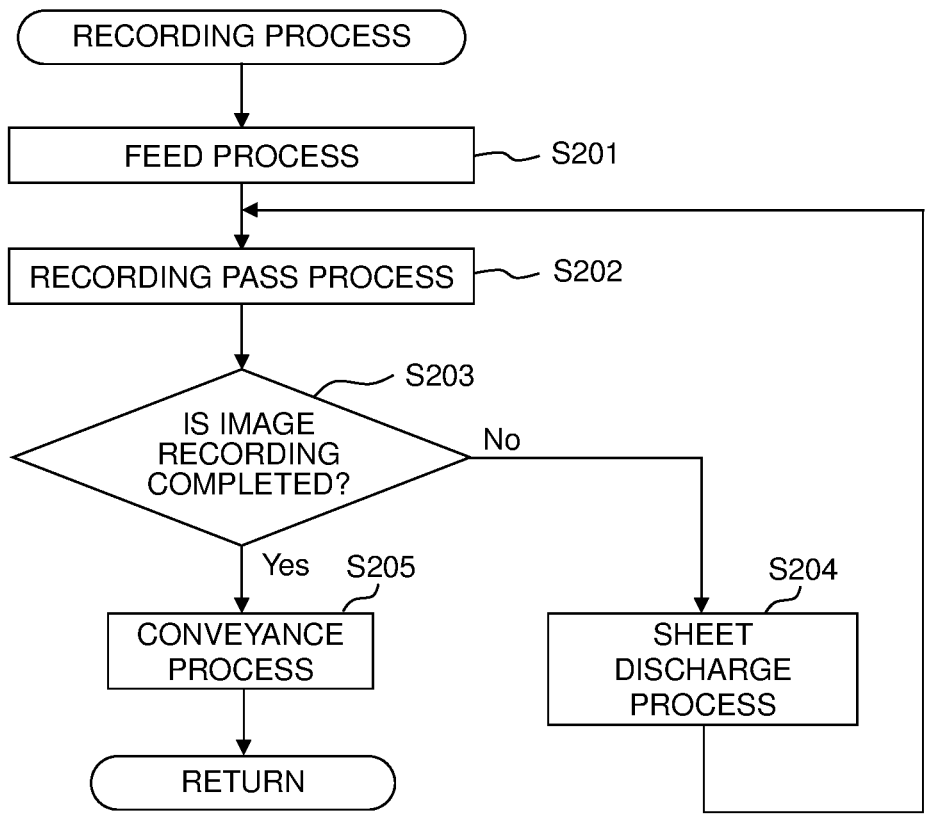
FIG. 11 is a flowchart indicating a recording process in FIG. 10.
FIG. 12 illustrates a relationship between each ink color discharged from an discharge-defective nozzle and each threshold value compared to the dot recording ratio, according to the first modified embodiment.
Figure 13:
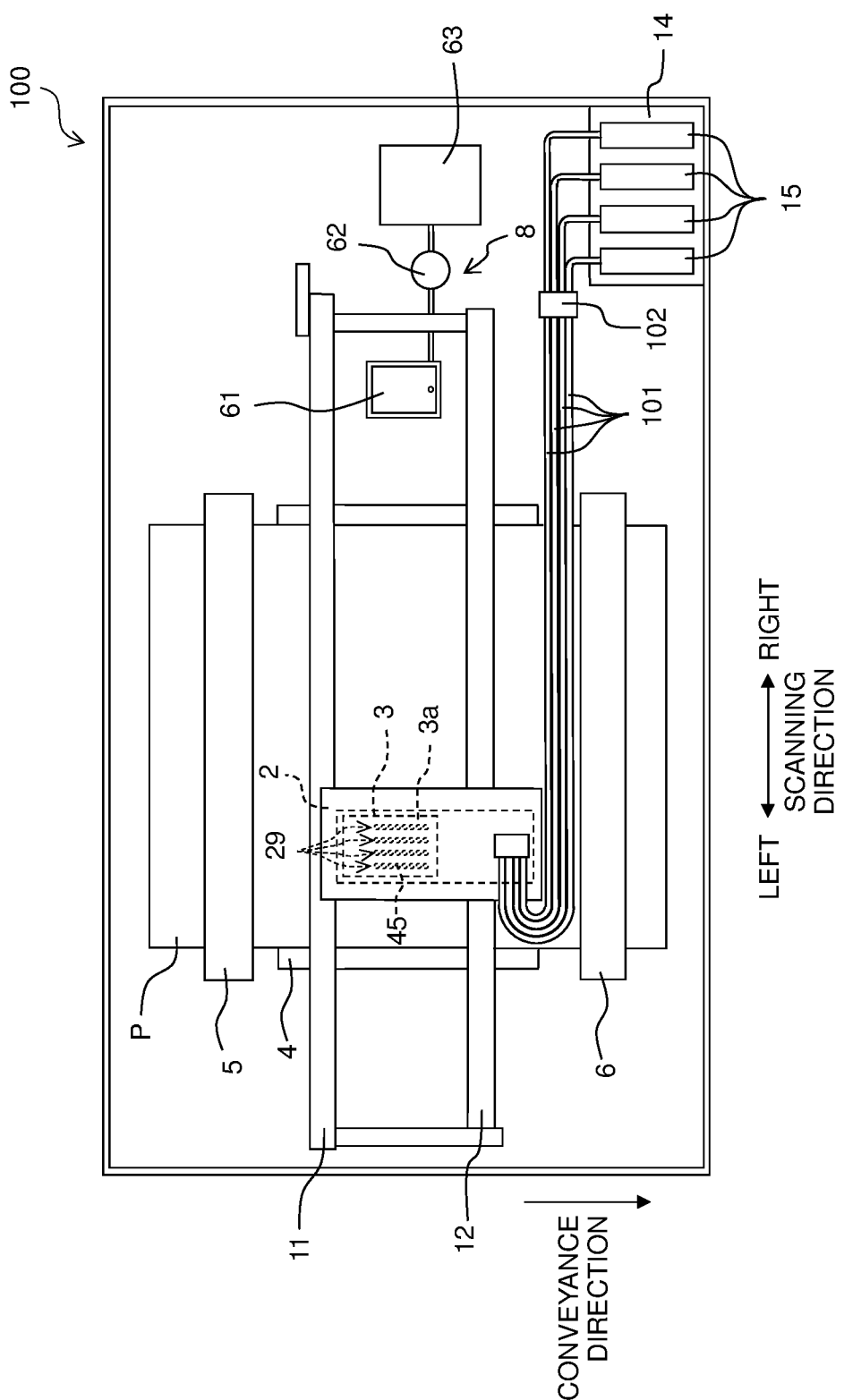
FIG. 13 schematically depicts a printer according to the second modified embodiment.

In the recording processes of S105 and S110, as indicated in FIG. 11, the controller 80 performs a feed process (S201). In the feed process, the controller 80 controls a feed mechanism (not depicted) and the conveyance motor 87 to feed the recording sheet P to a position where an area for which an image is to be recorded by the first recording pass faces the nozzles 10 of the ink-jet head 4.

Subsequently, the controller 80 performs a recording pass process (S202). In the recording pass process, the controller 80 controls the carriage motor 86 to move the carriage 2 in the scanning direction and controls the ink-jet head 4 via the driver IC to perform the recording pass in which ink is discharged from the nozzles 10 to the recording sheet P.

Subsequently, when image recording on the recording sheet P is not yet completed (S203: NO), the controller 80 returns to S202 after performing a conveyance process (S204). In the conveyance process of S204, the controller controls the conveyance motor 87 to convey the recording sheet P in the conveyance direction by use of the conveyance rollers 6 and 7. In a case of the recording process of S105 (in a case of the single pass recording mode), the recording paper P is conveyed by the length L of the nozzle row 9 in the conveying process of S204. In a case of the recording process of S110 (in a case of the multi-pass recording mode), the recording paper P is conveyed by the length (L/2) that is half of the length L of the nozzle row 9 in the conveying process of S204. Accordingly, the recording pass and the conveyance operation are performed alternatingly until the image recording on the recording sheet P is completed.

When the image recording on the recording sheet P is completed (S203: YES), the controller 80 performs a sheet discharge process (S205), and then returns to the flowchart of FIG. 10A. In the sheet discharge process of S205, the controller 80 controls the conveyance motor 87 to convey the recording sheet P in the conveyance direction by use of the conveyance rollers 6 and 7, thereby discharging the recording sheet P from the printer 1.

Returning to FIGS. 10A and 10B, after the recording process of S110, the controller 80 ends the series of processes in FIGS. 10A and 10B when the nozzles 10 include no discharge-defective nozzle (S111: NO). Or, the controller 80 ends the series of processes in FIGS. 10A and 10B when the nozzles 10 include the discharge-defective nozzle (S111: YES) and when the purge process of S109 is performed before the recording process of S110 (S112: YES).

When the nozzles 10 include the discharge-defective nozzle (S111: YES) and when the purge process of S109 is not performed before the recording process of S110 (S112: NO), the controller 80 performs the following process. When a recording instruction for instructing the printer 1 to record an image by the next multi-pass recording mode is input to the printer 1 (S113: YES) until a predefined time elapses (S115: NO), the controller returns to S110. When a recording instruction for instructing the printer 1 to record an image by the next single pass recording mode is input to the printer 1 (S114: YES) until the predefined time elapses (S115: NO), the controller returns to S104. When the predefined time has elapsed without the next recording instruction being input (S113: NO, S114: NO, S115: YES), the controller 80 performs the same purge process (S116) as S104 and S109, and ends the series of processes in FIGS. 10A and 10B.

Effect

In the case of the multi-pass recording mode, even when ink is not discharged from the nozzle 10 that is used for recording a thinned-out image with a small dot recording ratio R, the effect on image quality of the image to be recorded is small. Thus, in this embodiment, in the case of the multi-pass recording mode, when the nozzles 10 include the discharge-defective nozzle and when the dot recording ratio R for the discharge-defective nozzle is equal to or more than the threshold value, image recording is performed on the recording sheet P after the suction purge is performed. The suction purge eliminates the abnormality of the discharge-defective nozzle by discharging the ink in the ink-jet head 4 from the nozzles 10. Since image recording is performed after the suction purge, the decrease in the image quality of the image to be recorded is inhibited. When the nozzles 10 include the discharge-defective nozzle, and when the dot recording ratio R for the discharge-defective nozzle is less than the threshold value, image recording is performed on the recording sheet P without performing the suction purge. Accordingly, when the dot recording ratio R for the discharge-defective nozzle is small, the image to be recorded can have a good image quality and the time after the recording instruction is input until the image recording is completed is shortened.

However, when the number of discharge-defective nozzles is large, the image quality of the image to be recorded deteriorates even when the dot recording ratio R for the discharge-defective nozzle is small. In order to solve that problem, in this embodiment, when an image is recorded on the recording sheet P by the multi-pass recording mode, and when the number of discharge-defective nozzles Nu is equal to or more than the predefined nozzle Nt, image recording is performed on the recording sheet P after the suction purge, irrespective of the dot recording ratio R for the discharge-defective nozzle. This results in a good quality of the image to be recorded.

In this embodiment, the determination circuit 68 can output, based on the change (electrical change) in voltage value of the detection electrode 66 caused when ink is discharged from the nozzle 10 to the detection electrode 66, the signal that varies depending on whether or not the nozzle 10 is the discharge-defective nozzle.

When the dot recording ratio R for the discharge-defective nozzle is less than the threshold value Rt, image recording is performed on the recording sheet P by the multi-pass recording mode without performing the suction purge. In this case, when the next recording instruction is not input after the image recording is completed until the predefined time elapses, the abnormality of the discharge-defective nozzle can be removed by performing the suction purge. On the other hand, when the dot recording ratio R for the thinned-out image to be recorded by the discharge-defective nozzle is less than the threshold value Rt, image recording is performed on the recording sheet P by the multi-pass recording mode without performing the suction purge. In this case, when a recording instruction for instructing the printer 1 to record an image by the next multi-pass recording mode is input after the image recording is completed until the predefined time elapses, image recording is performed on the recording sheet P based on the recording instruction without performing the suction purge. This reduces the frequency of the suction purge and inhibits useless ink consumption when image recording by the multi-pass recording mode is repeated in a short period.

When image recording is performed by the single pass recording mode, and when the nozzles 10 include the discharge-defective nozzle, image recording can be performed on the recording sheet P without performing the suction purge. However, in this case, a line image corresponding to the discharge-defective nozzle is not recorded and a white streak is generated in an area of the recording sheet P where the line image corresponding to the discharge-defective nozzle should be recorded. In order to solve that problem, in this embodiment, when an image is recorded by the single pass recording mode, and when the nozzles 10 include the discharge-defective nozzle, image recording is performed on the recording sheet P after the suction purge. This inhibits the white streak that may otherwise be caused in the image to be recorded.

Modified Embodiments

The embodiment of the present disclosure is explained above. The present disclosure, however, is not limited to the above embodiment. Various changes or modifications may be made without departing from the claims.

In the above embodiment, the controller 80 determines whether the dot recording ratio R for the discharge-defective nozzle is equal to or more than the threshold value Rt irrespectively of which color of ink is discharged from the discharge-defective nozzle. Then, based on the determination, the controller 80 determines whether image recording is performed on the recording sheet P after performing the suction purge or whether image recording is performed on the recording sheet P without performing the suction purge. The present disclosure, however, is not limited to such an aspect.

For example, in the first modified embodiment, as depicted in FIG. 12, when the nozzle 10 (a first nozzle of the present disclosure), from which an ink of any other color than yellow (black ink, cyan ink, and magenta ink, a first ink of the present disclosure) is discharged, is the discharge-defective nozzle, the threshold value R1 is set to a threshold value Rt1 (a first threshold value of the present disclosure). When the nozzle 10 (a second nozzle of the present disclosure), from which the yellow ink (the first ink of the present disclosure) is discharged, is the discharge-defective nozzle, the threshold value Rt is set to a threshold value Rt2 (a second threshold value of the present disclosure) that is larger than the threshold value Rt1. In the first modified embodiment, a table, as indicated in FIG. 12, in which colors of inks are associated with threshold values Rt, Rt1, and Rt2 is memorized in advance in the flash memory 84 or the like.

The yellow ink has a paler or lighter color than the black, cyan, and magenta inks. Thus, even when the yellow ink is not discharged, the effect on the image quality of an image to be recorded is small. In view of the above, in the first modified embodiment, when the nozzle 10 from which an ink of any other color than yellow is discharged is the discharge-defective nozzle, the threshold value Rt is set to the threshold value Rt1. When the nozzle 10 from which the yellow ink is discharged is the discharge-defective nozzle, the threshold value Rt is set to the threshold value Rt2 that is larger than Rt1. In that configuration, when the nozzle 10 from which the yellow ink of which color is pale is discharged is the discharge-defective nozzle, image recording is performed on the recording sheet p without the suction purge even when the dot recording ratio R for the discharge-defective nozzle is slightly large. Accordingly, the image to be recorded can have a good image quality and the time after the recording instruction is input until the image recording is completed is shortened.

In the first modified embodiment, the threshold value Rt varies depending on whether the nozzle 10 from which an ink of any other color than yellow is discharged is discharge-defective nozzle or whether the nozzle 10 from which the yellow ink is discharged is the discharge-defective nozzle. The present disclosure, however, is not limited to such an aspect. The threshold value Rt may vary depending on whether the first nozzle from which the first ink having a certain color is discharged is the discharge-defective nozzle or whether the second nozzle from which the second ink having a paler or lighter color than the first ink is discharged is the discharge-defective nozzle.

In the above embodiment, when the number of discharge-defective nozzles Nu is equal to or more than the predefined number of nozzles Nt, image recording is performed on the recording sheet P after the suction purge, irrespective of the dot recording ratio R for the discharge-defective nozzle. The present disclosure, however, is not limited to such an aspect. For example, when the dot recording ratio R for at least one discharge-defective nozzle is larger than the threshold value Rt, image recording may be performed on the recording sheet P after the suction purge, irrespective of the number of discharge-defective nozzles. Further, when the dot recording ratios R for all the discharge-defective nozzles are less than the threshold value Rt, image recording may be performed on the recording sheet P without performing the suction purge.

In the above embodiment, the printer 1 is capable of performing image recording on the recording sheet P by selectively using any of the single pass recording mode and the multi-pass recording mode. When image recording is performed on the recording sheet P by the single pass recording mode, and when the nozzles 10 include the discharge-defective nozzle, image recording is performed on the recording sheet P after the suction purge. The present disclosure, however, is not limited thereto. For example, a printer capable of performing image recording on the recording sheet P only by the multi-pass recording mode may be used.

In the above embodiment, when the nozzles 10 include the discharge-defective nozzle, when image recording is performed on the recording sheet P by the multi-pass recording mode without performing the suction purge, and when the next recording instruction is not input after the image recording is completed until the predefined time elapses, the suction purge is performed and the series of processes is ended. The present disclosure, however, is not limited to such an aspect. For example, when the nozzles 10 include the discharge-defective nozzle, and when image recording is performed on the recording sheet P by the multi-pass recording mode without performing the suction purge, the series of processes may be ended after the suction purge is performed immediately after the image recording is completed.

Or, when the nozzles 10 include the discharge-defective nozzle, and when image recording is performed on the recording sheet P by the multi-pass recording mode without performing the suction purge, the series of processes may be ended without performing the suction purge after the image recording is completed.

In the above embodiment, the ink(s) in the ink-jet head 4 are discharged from the nozzles 10 through the suction purge. The present disclosure, however, is not limited thereto.

For example, in a printer 100 of the second modified embodiment, a pressurization pump 102 is provided in a tube 101 connecting the subtank 3 and the four ink cartridges.

Thus, in the printer 100, a pressurizing purge can be performed by driving the pressurization pump 102 in a state where the nozzles 10 are covered with the cap 61. In the pressurizing purge, the inks in the ink-jet head 4 are discharged from the nozzles 10 by pressurizing the inks in the tube 101, the subtank 3, and the ink-jet head 4. In the second modified embodiment, the controller 80 controls the pressurization pump 102 and the cap 61 to perform the pressurizing purge (the discharge operation of the present disclosure) in the purge process of S104, S109, and S116. In the second modified embodiment, a combination of the pressurization pump 102 and the cap 61 corresponds to a discharge mechanism of the present disclosure. In the second modified embodiment, the suction pump 62 may not be provided, and the cap 61 may be connected directly to the waste liquid tank 63.

Figure 14A:
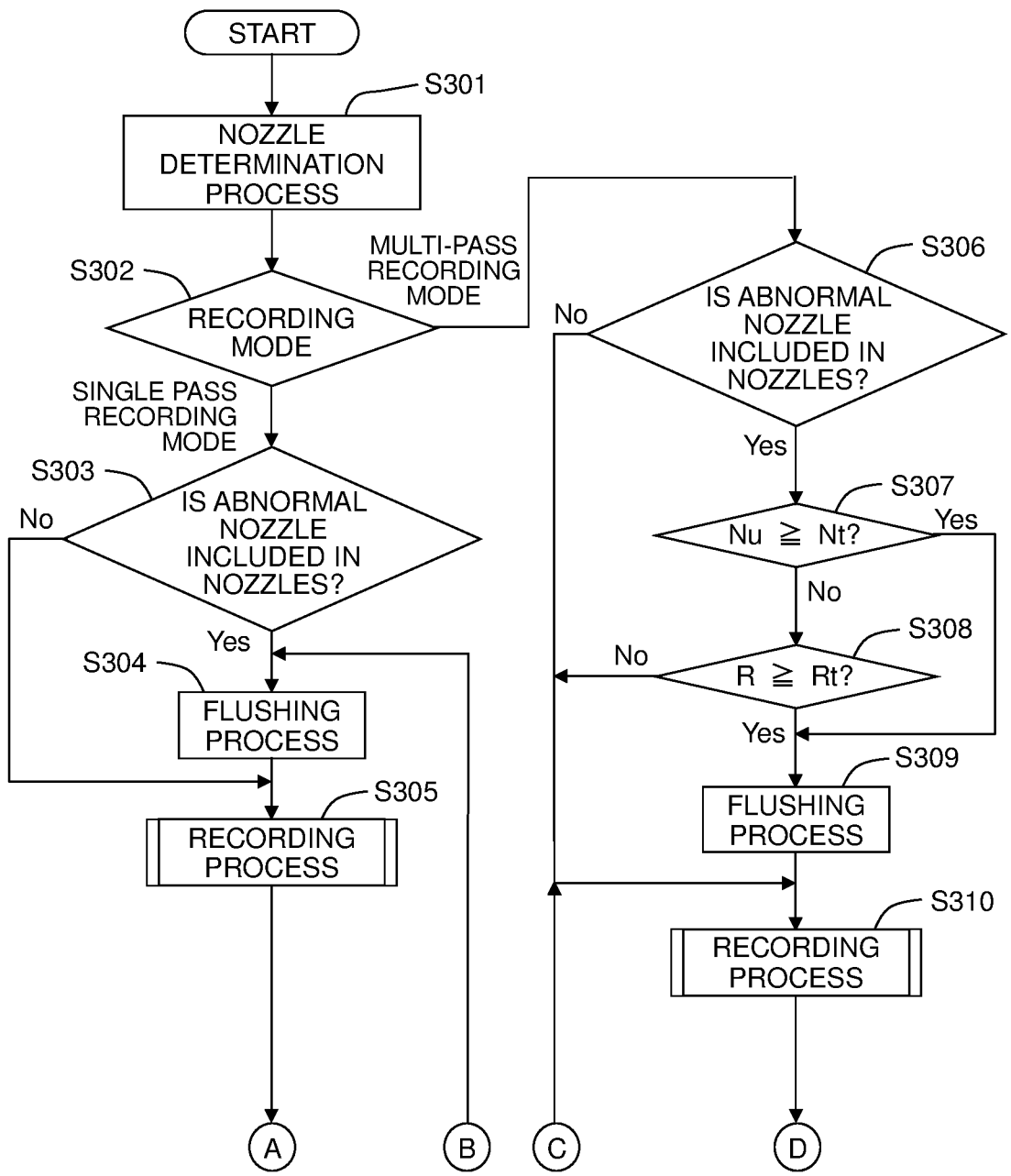
FIGS. 14A and 14B depict a flowchart indicating processes in recording according to the third modified embodiment.
Figure 14B:
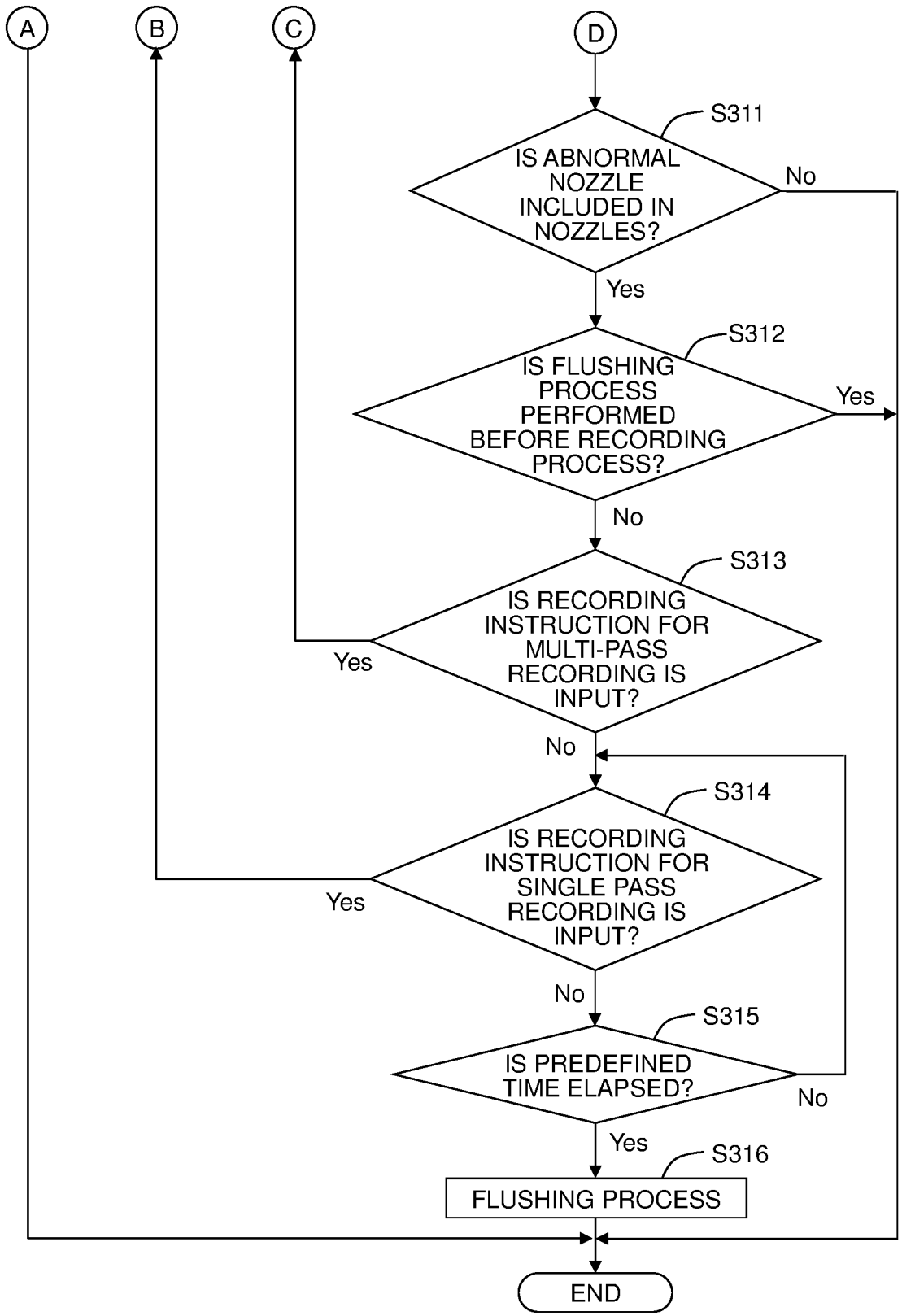

In the third modified embodiment, as indicated in FIGS. 14A and 14B, when an image is recorded on the recording sheet P by the single pass recording mode (S302: single pass recording mode), and when the nozzles 10 include the discharge-defective nozzle (S303: YES), the controller 80 performs a flushing process (S304). In the flushing process, the controller 80 performs flushing (the discharge operation of the present disclosure) by driving the driving element 50 corresponding to the discharge-defective nozzle of the piezoelectric actuator 22 to discharge ink from the discharge-defective nozzle. In this situation, the electrical potential applied to the individual electrode 54 may be higher than that at the time of image recording.

When image recording is performed on the recording sheet P by the multi-pass recording mode (S302: multi-pass recording mode), when the nozzles 10 include the discharge-defective nozzle (S306: YES), and when the number of discharge-defective nozzles Nu is equal to or more than the predefined number of nozzles Nt (S307: YES), the controller 80 performs the flushing process (S309) similar to S304.

When image recording is performed on the recording sheet P by the multi-pass recording mode (S302: YES), when the nozzles 10 include the discharge-defective nozzle (S306: YES), when the number of discharge-defective nozzles Nu is less than the predefined number of nozzles Nt (S307: NO), and when the dot recording ratio R for at least one discharge-defective nozzle is equal to or more than threshold value Rt (S308: YES), the controller 80 performs the flushing process (S309) similar to S304.

After image recording is performed on the recording sheet P by the multi-pass recording mode, when the nozzles 10 include the discharge-defective nozzle (S311: YES), when the flushing of S309 is not performed before the image recording (S312: NO), and when the next recording instruction is not input until the predefined time elapses (S313: NO, S314: NO, S315: YES), the controller 80 performs the flushing process (S316) similar to S304 and S309.

In the third modified embodiment, the driving element 50 performing the flushing corresponds to the discharge mechanism of the present disclosure. Further, in the third modified embodiment, the processes included in S306, S308, S311, S312, S313, and S314 and different from those as described above are similar to S106, S108, S111, S112, S113, and S114, respectively. Furthermore, the processes in S301, S305, and S310 of the third modified embodiment are similar to S101, S105, and S110 of the above embodiment, respectively.

As the discharge operation, two or more of the suction purge, the pressurizing purge, and the flushing may be performed. When the discharge operation includes the suction purge, the discharge mechanism of the present disclosure includes the maintenance unit 8. When the discharge operation includes the pressurizing purge, the discharge mechanism of the present disclosure includes the cap 61 and the pressurization pump 102. When the discharge operation includes the flushing, the discharge mechanism of the present disclosure includes the driving element 50. When the discharge operation includes the suction purge and the pressuring purge, the suction by the suction pump 62 and the pressurization by the pressurization pump may be performed separately or simultaneously.

In the above embodiment, when image recording is performed on the recording sheet P by the multi-pass recording mode, two recording areas G of the recording sheet P to be recorded by two continuous recording passes partially overlap with each other. Then, a thinned-out image obtained by thinning out different portions of the line image is recorded through the two recording passes in the overlapping area H where the two recording areas G overlap with each other. The present disclosure, however, is not limited to such an aspect. When image recording is performed on the recording sheet P by the multi-pass recording mode, three or more recording areas of the recording sheet P to be recorded by three or more continuous recording passes may partially overlap with each other. Then, a thinned-out image obtained by thinning out different portions of the line image may be recorded through the three or more recording passes in the overlapping area where the three or more recording areas overlap with each other.

In the above embodiment, whether or not the nozzle 10 is the discharge-defective nozzle is determined by using the voltage value of the detection electrode 66 when ink is discharged from the nozzle 10 to the detection electrode 66. The present disclosure, however, is not limited thereto.

For example, a detection electrode extending in the up-down direction may be provided in the printer, and whether the nozzle 10 is the discharge-defective nozzle may be determined using a voltage value of the detection electrode when the ink discharged from the nozzle 10 passes through an area facing the detection electrode. Or, an optical sensor that detects the ink discharged from the nozzle 10 may be provided in the printer, and whether the nozzle 10 is the discharge-defective nozzle may be determined based on a detection result of the optical sensor.

Or, for example, slimier to the description of Japanese Patent No. 4,929,699, a voltage detection circuit (the signal output circuit of the present disclosure) that detects a change in voltage when ink is discharged from the nozzle may be connected to a plate on which the nozzles of the ink-jet head are formed, and a signal that varies depending on whether or not the nozzle 10 is the discharge-defective nozzle may be output from the voltage detection circuit to the controller 80.

In the above embodiment, when no ink is discharged from the nozzle 10, the controller 80 determines that the nozzle 10 is the discharge-defective nozzle. The present disclosure, however, is not limited thereto. For example, a configuration for detecting a flying speed of the ink discharged from the nozzle 10 may be provided in the printer. When the flying speed is slower than a predefined speed, the controller 80 may determine that the nozzle 10 is the discharge-defective nozzle.

In the above embodiment, the determination whether the nozzle 10 is the discharge-defective nozzle is performed for each of the nozzles 10 based on the signal from the determination circuit 68. The present disclosure, however, is not limited thereto. For example, the determination whether the nozzle 10 is the discharge-defective nozzle may be performed for some of the nozzles 10 based on the signal from the determination circuit 68, and the controller may infer whether the remaining nozzles 10 are the discharge-defective nozzles based on the determination result of the some of the nozzles 10.

In the above embodiment, ink is discharged from the nozzle 10 when the driving element 50 applies pressure to the ink in the pressure chamber 40. The present disclosure, however, is not limited thereto. For example, ink may be discharged from the nozzle by heating ink and generating bubbles in the ink channel(s).

In the above embodiment, the recording sheet P is conveyed by the conveyance rollers 6 and 7. The present disclosure, however, is not limited thereto. For example, the recording sheet P may be conveyed by a conveyance belt. In this case, the conveyance belt corresponds to the conveyer of the present disclosure. Or, the medium may be conveyed by providing a movable table by use of a ball screw or the like and moving the table with the medium placed on the table. In this case, the table that is movable through the ball screw or the like corresponds to the conveyer of the present disclosure.

The examples in which the present disclosure is applied to the printer that discharges ink from nozzles to perform recording on a recording sheet P are explained above. The present disclosure, however, is not limited thereto. The present disclosure is applicable to a liquid discharge apparatus discharging any other liquid than ink, such as liquefied resin and liquefied metal.

What is claimed is:
1. An image recording apparatus, comprising:
a conveyer configured to convey a medium in a conveyance direction;
a recording head including a plurality of nozzles arranged in the conveyance direction;
a carriage carrying the recording head and configured to move in a scanning direction intersecting with the conveyance direction;
a discharge mechanism configured to discharge ink in the recording head from the nozzles; a signal output circuit configured to output a signal that varies depending on whether the nozzles include a discharge-defective nozzle of which discharge performance is lower than a predefined discharge performance; and
a controller configured to:
determine whether the discharge-defective nozzle is included in the nozzles based on the signal from the signal output circuit;
control the image recording apparatus to perform image recording on the medium by causing the image recording apparatus to perform a recording pass in which the ink is discharged from the nozzles to the medium during movement in the scanning direction of the carriage and a conveyance operation in which the medium is conveyed in the conveyance direction by use of the conveyer; and control the image recording apparatus to perform the image recording by a multi-pass recording mode, wherein the recording pass includes a plurality of recording passes performed continuously, wherein in the multi-pass recording mode, a thinned-out image is recorded by conveying the medium in the conveyance operation such that a plurality of recording areas on the medium for which an image is to be recorded by the recording passes performed continuously partially overlap with each other, and recording a line image corresponding to one line in the scanning direction in an overlapping area, where the recording areas overlap with each other, in the recording passes performed continuously by use of the nozzles different from each other so that different parts of the line image are thinned out, wherein in a case that the image recording is performed by the multi-pass recording mode, that the discharge-defective nozzle is included in the nozzles, and that a dot recording ratio that is a ratio of a number of dots of the thinned-out image to be recorded by the discharge-defective nozzle to the number of dots of an entirety of the line image is equal to or more than a threshold value, the controller is configured to control the discharge mechanism to perform a discharge operation and then controls the image recording apparatus to perform the image recording on the medium, and wherein in a case that the dot recording ratio for the thinned-out image to be recorded by the discharge-defective nozzle is less than the threshold value, the controller is configured to control the image recording apparatus to perform the image recording on the medium without performing the discharge operation by the discharge mechanism.

2. The image recording apparatus according to claim 1, wherein the predefined discharge performance is one of a discharge performance as to whether an ink droplet of a predetermined size can be discharged, a discharge performance as to whether the ink droplet can be discharged at a predetermined speed, and a discharge performance as to whether the ink droplet can be discharged in a predetermined direction.

3. The image recording apparatus according to claim 1, further comprising a conductive portion for detection connected to the signal output circuit, wherein the signal output circuit is configured to output, in response to an electrical change in the conductive portion for detection caused by the ink discharged from a certain nozzle included in the nozzles, a signal that varies depending on whether the certain nozzle is the discharge-defective nozzle.

4. The image recording apparatus according to claim 1, wherein the signal output circuit is configured to output a signal indicating that a nozzle included in the nozzles and from which the ink is not discharged is the discharge-defective nozzle.

5. The image recording apparatus according to claim 1, wherein, in a case that the dot recording ratio for the thinned-out image to be recorded by the discharge-defective nozzle is less than the threshold value, and that the image recording is performed on the medium by the multi-pass recording mode without the discharge operation by the discharge mechanism, the controller is configured to control the discharge mechanism to perform the discharge operation after the image recording.

6. The image recording apparatus according to claim 5, wherein in the case that the dot recording ratio for the thinned-out image to be recorded by the discharge-defective nozzle is less than the threshold value, and that the image recording is performed on the medium by the multi-pass recording mode without the discharge operation by the discharge mechanism, the controller is configured to control the discharge mechanism to perform the discharge operation in a case that a recording instruction is not input after the image recording is completed until a predefined time elapses, and the controller is configured to control the image recording apparatus to perform image recording on the medium, based on a recording instruction instructing the image recording apparatus to perform image recording by the multi-pass recording mode, without the discharge operation by the discharge mechanism, in a case that the recording instruction is input after the image recording is completed until the predefined time elapses.

7. The image recording apparatus according to claim 1, wherein the nozzles are arranged in the conveyance direction to have a predefined length, the controller is configured to control the image recording apparatus to perform the image recording by selectively using the multi-pass recording mode and a single pass recording mode in which the medium is conveyed in the conveyance direction by the predefined length and the line image is recorded by the recording pass performed once, and in a case that the image recording is performed by the single pass recording mode and that the discharge-defective nozzle is included in the nozzles, the controller is configured to control the image recording apparatus to perform the image recording on the medium after the discharge operation by the discharge mechanism.

8. The image recording apparatus according to claim 1, wherein the discharge-defective nozzle includes a plurality of discharge-defective nozzles, in the case that the image recording is performed by the multi-pass recording mode, and in a case that a number of the discharge-defective nozzles is equal to or more than a predefined number of nozzles, the controller is configured to control the image recording apparatus to perform the image recording on the medium after the discharge operation by the discharge mechanism, irrespectively of the dot recording ratio for the thinned-out image to be recorded by the discharge-defective nozzles.

9. The image recording apparatus according to claim 1, wherein the nozzles include a plurality of first nozzles from which first ink is discharged and a plurality of second nozzles from which second ink having a paler or lighter color than the first ink is discharged, the controller is configured to set the threshold value to a first threshold value in a case that the discharge-defective nozzle is the first nozzle, and the controller is configured to set the threshold value to a second threshold value larger than the first threshold value in a case that the discharge-defective nozzle is the second nozzle.

10. The image recording apparatus according to claim 9, wherein the second ink is yellow ink, and the first ink is ink having any other color than the yellow ink.

11. The image recording apparatus according to claim 1, wherein the discharge mechanism includes a cap configured to cover the nozzles and a suction pump connected to the cap.

12. The image recording apparatus according to claim 1, wherein the discharge mechanism includes a pressurization pump configured to pressurize the ink in the recording head.

13. The image recording apparatus according to claim 1, wherein the recording head includes a plurality of pressure chambers communicating with the nozzles and a plurality of driving elements configured to apply pressure to the ink in the pressure chambers, and the discharge mechanism includes the driving elements.

* * * * *

UNITED STATES PATENT AND TRADEMARK OFFICE
CERTIFICATE OF CORRECTION

PATENT NO. : 11,135,836 B2
APPLICATION NO. : 16/805043
DATED : October 5, 2021
INVENTOR(S) : Satoru Arakane It is certified that error appears in the above-identified patent and that said Letters Patent is hereby corrected as shown below:

In the Claims

Column 18, Claim 1, Line 50:
Please delete "a signal output circuit"

Column 18, Claim 1, Line 51:
Please delete "configured to" and insert indented --a signal output circuit configured to--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*